(No Model.)
A. E. WOOLF.
METHOD OF AND APPARATUS FOR DISINFECTING AND DEODORIZING.
No. 580,919. Patented Apr. 20, 1897.
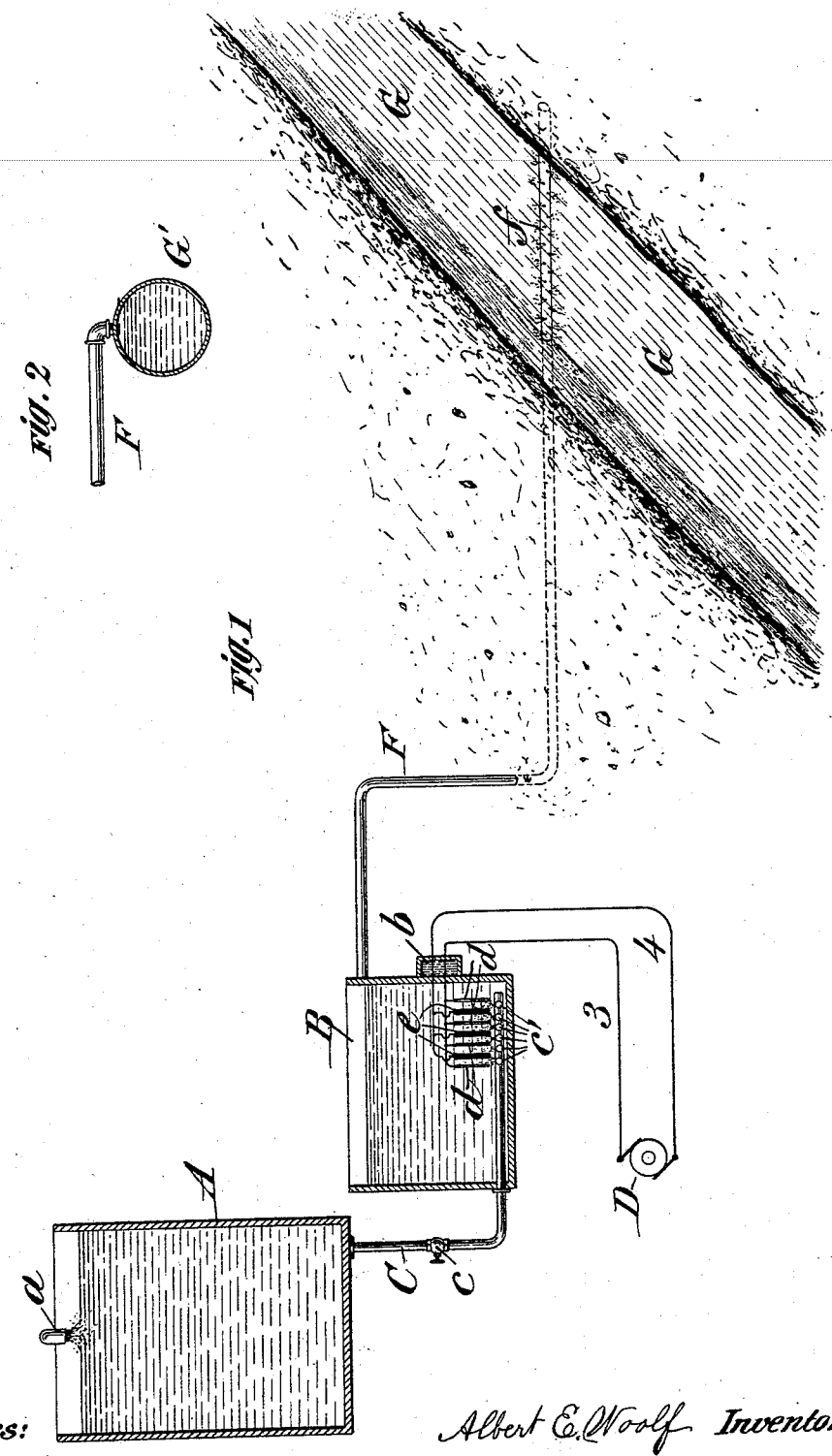

United States Patent Office.

ALBERT E. WOOLF, OF NEW YORK, N. Y.

METHOD OF AND APPARATUS FOR DISINFECTING AND DEODORIZING.

SPECIFICATION forming part of Letters Patent No. 580,919, dated April 20, 1897.

Application filed April 19, 1894. Serial No. 508,148. (No model.)

*To all whom it may concern:*

Be it known that I, ALBERT E. WOOLF, a citizen of the United States, residing at New York, in the county and State of New York, have invented certain new and useful Improvements in Methods of and Apparatus for Disinfecting and Deodorizing; and I do hereby declare the following to be a full, clear, and exact description of the invention, such as will enable others skilled in the art to which it appertains to make and use the same.

My invention has for its principal object the disinfection or purification of running streams or brooks of water which constitute the source or sources of supply of drinking-water for towns and cities. It is also applicable to the sewers or sewer-pipes of a city for the purpose of disinfecting and deodorizing the streams of sewage and infected water flowing therethrough, so that they may be discharged into rivers, streams, and other places without endangering life and health. The great increase in urban populations and the wide extension of suburban communities which characterize the present time have greatly increased the difficulty of securing and maintaining unpolluted sources of drinking-water for cities and of safely conveying away and disposing of the sewage. Systems of filtration have not proven satisfactory when applied to large systems of water-supply, and in the very nature of things it is impossible to prevent the water from becoming more or less polluted as it is being collected into the reservoirs. It is necessary, therefore, to disinfect it in order to render it safe for use. This has heretofore been deemed impossible with a general supply because of the enormous quantities of water required for daily use in large cities and because to accomplish it would necessitate the constant production and application of a proportionately large quantity of the disinfectant, the cost of which was regarded as prohibitive. This I accomplish by an improved plant, which is adapted for rapidly and economically producing a disinfecting and deodorizing solution by the electrolysis of sea-water or a solution of common salt, and continuously distributing and applying the resulting disinfecting and deodorizing liquid to an open channel, stream-bed, conduit, or pipe through which is flowing infected water or sewage, for disinfecting and deodorizing the same.

My disinfecting and deodorizing plant embraces a storage tank or reservoir containing sea-water or a solution of chlorid of sodium, an electrolyzing-tank containing positive and negative electrodes, a pipe connection between said tanks for supplying the electrolyte, an overflow-pipe leading from the electrolyzing-tank and connecting either with a closed conduit or an open channel for conducting infected water or sewage and a dynamo, storage battery, or other source of electricity connecting with the positive and negative electrodes in the electrolyzing-tank.

The details of construction and arrangement of my disinfecting and deodorizing plant are illustrated in the accompanying drawings, in which—

Figure 1 represents the apparatus partly in vertical section and partly in elevation, in connection with a perspective view of an open conduit or channel, being a diagrammatic representation of a plant embodying my invention in use at Brewster, New York, in connection with the water-supply of New York city. Fig. 2 represents a transverse section of a closed conduit having connected therewith a pipe for supplying the disinfecting and deodorizing liquid.

The storage tank or reservoir A is preferably placed in an elevated position, and in practice is supported on a suitable frame or foundation, and has connected therewith a supply-pipe $a$, which may connect with a feed-pump. (Not here shown.) The electrolyzing-tank B is preferably supported on a frame or foundation at a level just below the storage-tank. A pipe C, having a valve $c$, leads from the bottom of tank A to the bottom of tank B, and in the latter tank is provided with a number of lateral branches $c'$, which are slotted or perforated along the top to discharge streams of inflowing liquid upward between the positive and negative electrodes, as indicated in the drawings. The positive electrodes $d$, of platinum, are alternated with the negative electrodes $e$, of carbon or other suitable material, and are connected, respectively, with the electrical conductors 3 and 4, leading from the dynamo D or from a storage battery or other source of electricity. The conductors 3 and 4, as here shown, pass through a box of insulating material $b$, secured to the side of the tank, and are suitably connected to the positive and negative electrodes. They may, however, enter the tank in any other suitable way. An overflow-pipe F connects with tank B at any suitable point for conducting off the electrolyzed sea-water or other saline solution, and may terminate at its outer end with the perforated portion $f$, which is arranged transversely across the channel or stream G for distributing small streams or sprays of the disinfecting and deodorizing liquid into the water, infected liquid, or sewage flowing through the stream-bed, channel, or conduit.

In case a pipe or closed conduit G' is in use, as shown in Fig. 2, the supply-pipe F may connect simply with the conduit, as shown.

By arranging the perforated pipes $c'$ near the bottom of tank B, so as to discharge the inflowing sea-water between the electrodes, the latter are freed from deposits of alkaline earths, such as magnesia, which are apt to be deposited during the electrolyzing process upon the negative electrodes and interfere with their efficiency. The streams of inflowing sea-water or other saline solution agitate the electrolyte and wash away the deposits. By this method of supplying the electrolyte it is subjected directly to the electrolyzing action of the electric current, by which the chlorids and bromids are converted into hypochlorites and hypobromites. The inflowing sea-water also causes a circulation of the electrolyte contained in the tank between and in contact with the electrodes, so that the whole body of liquid is subjected to electrolysis before it passes to pipe F, by which it is discharged into the channel or conduit containing the sewage or other infected liquid to be purified.

Natural sea-water, having a density of about 3° Baumé, is preferably supplied to tank A, and thence to the electrolyzing-tank B in the manner above described. An electric current of low pressure, such as two and one-half to five volts, is preferably used for the reason that it is effective for producing the desired result and is produced at small expense. The quantity or amperes of current required will depend upon the amount of work to be done—that is, the quantity of sea-water to be electrolyzed.

By means of my apparatus, arranged and operated as above described, I have demonstrated that a large volume of flowing water, constituting one of main streams supplying drinking-water to New York city, can be continuously and effectively disinfected and deodorized.

In case the plant is situated near the sea or near any body of salt water connected therewith the reservoir containing the sea-water or saline solution may be dispensed with, and a pump or other means of transferring the water from the sea to the electrolyzing-tank may be used in lieu thereof.

What I claim, and desire to secure by Letters Patent, is—

1. The combination, with an electrolyzing-tank of the positive and negative electrodes suitably spaced apart near its bottom a source of electricity connecting with said electrodes, a supply-pipe having perforations arranged to discharge streams of liquid between the electrodes, means for forcing sea-water, under pressure, through said pipe for causing circulation of the electrolyte in contact with the electrodes, and a discharge-pipe for electrolyzed liquid.

2. The method of disinfecting and deodorizing, which consists in discharging or injecting into a stream of infected water or sewage, an electrolyzed solution of salt water, substantially as described.

In testimony whereof I affix my signature in presence of two witnesses.

ALBERT E. WOOLF.

Witnesses:
M. J. GLYNN,
SAML. SNOW.